United States Patent
Lee

(10) Patent No.: US 8,836,468 B2
(45) Date of Patent: Sep. 16, 2014

(54) PARAMETER COPY METHOD AND KEYPAD HAVING PARAMETER COPY FUNCTION BY RECOGNIZING SOFTWARE VERSIONS AND INVERTER TYPES

(75) Inventor: Jinmok Lee, Cheonan-si (KR)

(73) Assignee: LSIS Co., Ltd., Anyang-Si, Gyeonggi-Do (KR)

( * ) Notice: Subject to any disclaimer, the term of this patent is extended or adjusted under 35 U.S.C. 154(b) by 302 days.

(21) Appl. No.: 13/410,220

(22) Filed: Mar. 1, 2012

(65) Prior Publication Data
US 2012/0235783 A1     Sep. 20, 2012

(30) Foreign Application Priority Data
Mar. 18, 2011  (KR) .................. 10-2011-0024564

(51) Int. Cl.
*G05B 19/02*   (2006.01)
*G05B 19/042*  (2006.01)

(52) U.S. Cl.
CPC .... *G05B 19/042* (2013.01); *G05B 2219/23295* (2013.01); *G05B 2219/25081* (2013.01)
USPC ......................................................... 340/4.3

(58) Field of Classification Search
USPC ................. 340/4.3, 3.1; 710/8; 707/822
See application file for complete search history.

(56) References Cited

U.S. PATENT DOCUMENTS 5,109,163 A *  4/1992  Benhamida ................... 327/143
8,612,631 B2 * 12/2013  Matsumoto ....................... 710/2

FOREIGN PATENT DOCUMENTS

JP     2005-168241    6/2005
JP     2008-154432    7/2008

OTHER PUBLICATIONS

The State Intellectual Property Office of the People's Republic of China Application Serial No. 201210071824.9, Office Action dated Nov. 29, 2013, 6 pages.
Korean Intellectual Property Office Application Serial No. 10-2011-0024564, Office Action dated Sep. 19, 2012, 3 pages.

* cited by examiner

*Primary Examiner* — Vernal Brown
(74) *Attorney, Agent, or Firm* — Lee, Hong, Degerman, Kang & Waimey

(57) ABSTRACT

According to one embodiment, a keypad includes: a communication unit transmitting data to a plurality of inverters and receiving data from the plurality of inverters; and a controller determining whether type of a first inverter received from the communication unit is same as that of a second inverter, and performing a parameter copy if the type of a first inverter received from the communication unit is same as that of the second inverter, whereby parameters can be copied regardless of types and program versions of inverter, and parameter copy in a plurality of inverters each having a different type can be easily performed.

15 Claims, 5 Drawing Sheets

PARAMETER COPY METHOD AND KEYPAD HAVING PARAMETER COPY FUNCTION BY RECOGNIZING SOFTWARE VERSIONS AND INVERTER TYPES

CROSS REFERENCE TO RELATED APPLICATIONS

Pursuant to 35 U.S.C. §119 (a), this application claims the benefit of earlier filing date and right of priority to Korean Patent Application No.10-2011-0024564, filed on Mar. 18, 2011, the contents of which is hereby incorporated by reference in their entirety.

BACKGROUND OF THE DISCLOSURE

1. Field of Endeavor

The present disclosure relates to a parameter copy method and keypad having parameter copy function by recognizing software versions and inverter types, and more particularly to a parameter copy method having parameter copy function by recognizing software versions and inverter types, capable of having parameter copy function by self-recognizing software versions and inverter types, and a keypad using the same.

2. Background

Recently, most of product manufacturing lines are more automated than the conventional ones, and a driving system includes a motor for performing the automation system. A plurality of inverters is required for precise control of a plurality of motors, and a device like a PLC (Programmable Logic Controller) is widely used for controlling the plurality of inverters.

In a case the plurality of inverters is initially installed, an inverter parameter must be set, and a keypad is used to set the inverter parameter. That is, an inverter stores a plurality of parameters for motor operation, and a user can check and change the plurality of parameters by using the keypad.

In most cases, the parameter copy function of an inverter has been used for same type. However, as the inverter develops by segmentation, there has been a difficulty in copying a parameter for a new type of inverter. Moreover, there is another difficulty in parameter copy if software program is upgraded despite the same type of inverter.

FIGS. 1, 2 and 3 illustrate a parameter copy process of an inverter in a conventional keypad.

Referring to FIG. 1, parameters are copied by a conventional keypad 10 in a plurality of inverters 20-1, 20-2, each inverter having a same version and type. That is, a parameter stored in the first inverter 20-1 is copied and stored in the second inverter 20-2, where the second inverter 20-2 sets the parameter.

Furthermore, the conventional keypad 10 performs a read operation in a flow as illustrated in FIG. 2. That is, the keypad 10 checks whether there is a read command S30, and copies an inverter parameter S40 if there is a read command S30-Y. However, the conventional keypad 10 performs no operation if there is no read command S30-N.

Meanwhile, the conventional keypad 10 performs a write operation in a flow as illustrated in FIG. 3. That is, the keypad 10 checks whether there is a write command S50, and checks if sizes of parameters stored in the keypad 10 are same S60 if there is a write command S50-Y. If sizes of parameters stored in the keypad 10 are same S60-Y, the keypad copies the parameter S70, and if sizes of parameters stored in the keypad 10 are not same S60-N, the Keypad 10 ends the operation without copying. Meantime, if there is no write command S50-N, the keypad 10 performs no operation at all.

As noted above, problems in the conventional keypad 10 are that the parameter copy is effective as long as there is same version and type, but the parameter copy cannot be performed, if types or program versions of inverter are different.

SUMMARY

The present disclosure has been made to solve the foregoing problems of the prior art and therefore an object of certain embodiments of the present invention is to provide a parameter copy method having parameter copy function by recognizing software versions and inverter types regardless of inverter types and software versions, and a keypad using the same.

Another object is to provide a parameter copy method capable of self-recognizing the software versions and inverter types, and a keypad using the same.

In one general aspect of the present disclosure, there is provided a keypad, the keypad comprising: a communication unit transmitting data to a plurality of inverters and receiving data from the plurality of inverters; and a controller determining whether type of a first inverter received from the communication unit is same as that of a second inverter, and performing a parameter copy if the type of a first inverter received from the communication unit is same as that of the second inverter.

Preferably, but not necessarily, the controller determines whether type of the first inverter received from the communication unit is same as that of the second inverter, and reads out the parameter of the first inverter to perform a parameter copy function relative to the second inverter, if the type of the first inverter received from the communication unit is same as that of the second inverter.

Preferably, but not necessarily, the controller reads out the parameter of the first inverter to convert the parameter of the first inverter to a parameter corresponding to the type of the second inverter and to perform a parameter copy relative to the second inverter, if it is determined that the type of the first inverter from the communication unit is not the same as that of the second inverter.

Preferably, but not necessarily, the controller reads out a program version of the first inverter received from the communication unit and a program version of the second inverter, and performs a parameter copy function only if it is determined that the program version of the first inverter from the communication unit and the program version of the second inverter are same.

Preferably, but not necessarily, the controller reads out the parameter of the first inverter to convert the parameter of the first inverter to a parameter corresponding to the program version of the second inverter and to perform a parameter copy relative to the second inverter, if it is determined that the program version of the first inverter received from the communication unit is not the same as that of the second inverter.

Preferably, but not necessarily, the keypad further comprises a key input unit receiving a parameter copy command from a user.

Preferably, but not necessarily, the parameter copy command is a command for reading out the parameter of the first inverter or a command for setting the read-out parameter to the second inverter.

Preferably, but not necessarily, the keypad further comprises storage for temporarily storing the types or program versions of inverter received through the communication unit, and parameters of inverter read out through the communication unit.

Preferably, but not necessarily, the keypad further comprises a display unit for displaying an operation state of at least one inverter connected through the communication unit.

Preferably, but not necessarily, the keypad further comprises a reset unit for preventing an erroneous operation of the controller by checking an operation voltage for operating the controller.

In another general aspect of the present disclosure, there is provided a parameter copy method having parameter copy function by recognizing software versions and inverter types, the method comprising: determining a type of a first inverter and a type of a second inverter; determining whether the type of the first inverter and the type of the second inverter are same; and performing a parameter copy function if it is determined that the type of the first inverter and the type of the second inverter are same.

Preferably, but not necessarily, the parameter copy function performing step includes: reading out a parameter of the first inverter to perform a parameter copy function relative to the second inverter, if the type of the first inverter received from the communication unit is same as that of the second inverter by determining the type of the first inverter and the type of the second inverter.

Preferably, but not necessarily, the parameter copy function performing step includes: reading out the parameter of the first inverter to convert the parameter of the first inverter to a parameter corresponding to the type of the second inverter and to perform a parameter copy relative to the second inverter, if it is determined that the type of the first inverter from the communication unit is not the same as that of the second inverter.

Preferably, but not necessarily, the parameter copy function performing step includes: reading out the parameter of the first inverter to convert the parameter of the first inverter to a parameter corresponding to the type of the second inverter and to perform a parameter copy relative to the second inverter, if it is determined that the type of the first inverter received from the communication unit is not the same as that of the second inverter.

Preferably, but not necessarily, the method further comprises: reading out a program version of the first inverter and a program version of the second inverter, wherein the parameter copy function performing step performs a parameter copy function only if it is determined that the program version of the first inverter received from the communication unit and the program version of the second inverter are same.

Preferably, but not necessarily, the parameter copy function performing step includes reading out the parameter of the first inverter to convert the parameter of the first inverter to a parameter corresponding to the program version of the second inverter and to perform a parameter copy relative to the second inverter, if it is determined that the program version of the first inverter from the communication unit is not the same as that of the second inverter.

Preferably, but not necessarily, the method further comprises receiving a parameter copy command from a user.

Preferably, but not necessarily, the parameter copy command is a command for reading out the parameter of the first inverter or a command for setting the read-out parameter to the second inverter.

The configuration of keypad according to exemplary embodiments of the present disclosure has an advantageous effect in that parameters can be copied regardless of types and program versions of inverter, and parameter copy in a plurality of inverters each having a different type can be easily performed.

BRIEF DESCRIPTION OF THE DRAWINGS

The drawing figures depict one or more implementations in accord with the present concepts, by way of example only, not by way of limitations. In the figures, like reference numerals refer to the same or similar elements.

The accompanying drawings, which are included to provide a further understanding of the disclosure and are incorporated in and constitute a part of this application, also illustrate embodiment(s) of the disclosure, and together with the description serve to explain the principle of the disclosure. In the drawings.

DETAILED DESCRIPTION

Figure 1:
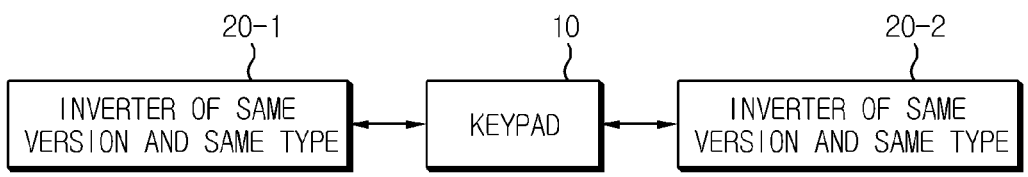
FIG. 1 is a schematic view illustrating an operation environment according to a conventional keypad.
Figure 2:
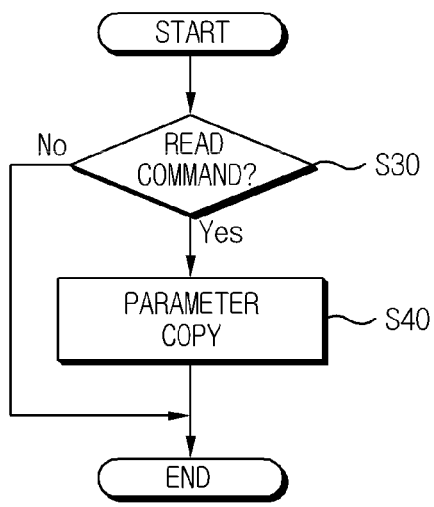
FIG. 2 is a flowchart illustrating a process in which a read-out command is performed according to a conventional keypad.
Figure 3:
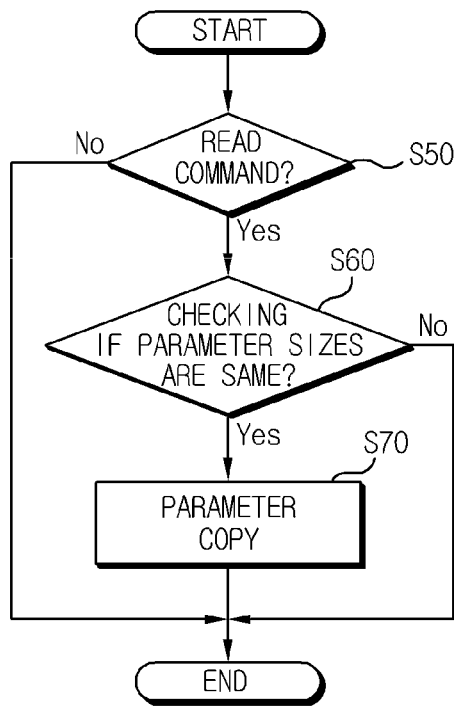
FIG. 3 is a flowchart illustrating a process in which a write command is performed according to a conventional keypad.

The disclosed embodiments and advantages thereof are best understood by referring to FIGS. 1-4 of the drawings, like numerals being used for like and corresponding parts of the various drawings. Other features and advantages of the disclosed embodiments will be or will become apparent to one of ordinary skill in the art upon examination of the following figures and detailed description. It is intended that all such additional features and advantages be included within the scope of the disclosed embodiments, and protected by the accompanying drawings. Further, the illustrated figures are only exemplary and not intended to assert or imply any limitation with regard to the environment, architecture, or process in which different embodiments may be implemented. Accordingly, the described aspect is intended to embrace all such alterations, modifications, and variations that fall within the scope and novel idea of the present invention.

Meanwhile, the terminology used herein is for the purpose of describing particular implementations only and is not intended to be limiting of the present disclosure. The terms "first," "second," and the like, herein do not denote any order, quantity, or importance, but rather are used to distinguish one element from another. For example, a second constituent element may be denoted as a first constituent element without departing from the scope and spirit of the present disclosure, and similarly, a first constituent element may be denoted as a second constituent element.

As used herein, the terms "a" and "an" herein do not denote a limitation of quantity, but rather denote the presence of at least one of the referenced item. That is, as used herein, the singular forms "a", "an" and "the" are intended to include the plural forms as well, unless the context clearly indicates otherwise.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Also, "exemplary" is merely meant to mean an example, rather than the best. If is also to be appreciated that features, layers and/or elements depicted herein are illustrated with particular dimensions and/or orientations relative to one another for purposes of simplicity and ease of understanding, and that the actual dimensions and/or orientations may differ substantially from that illustrated.

That is, in the drawings, the size and relative sizes of layers, regions and/or other elements may be exaggerated or reduced for clarity. Like numbers refer to like elements throughout and explanations that duplicate one another will be omitted. As may be used herein, the terms "substantially" and "approximately" provide an industry-accepted tolerance for its corresponding term and/or relativity between items.

Hereinafter, the present disclosure will be described in detail with reference to the accompanying drawings.

Figure 4:
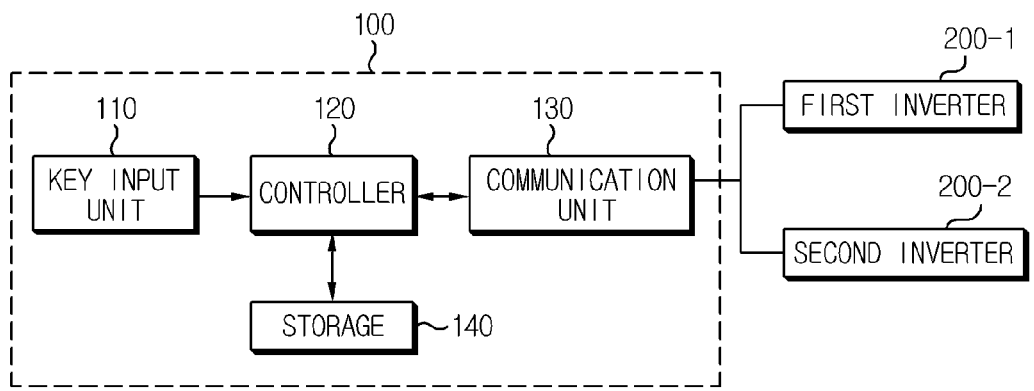
FIG. 4 is a block diagram illustrating a configuration of a keypad according to an exemplary embodiment of the present disclosure.

FIG. 4 is a block diagram illustrating a configuration of a keypad according to an exemplary embodiment of the present disclosure.

Referring to FIG. 4, a keypad 100 according to an exemplary embodiment of the present disclosure includes a key input unit 110, a controller 120, a communication unit 130 and storage 140.

The key input unit 110 functions to transmit a user command to the controller 120 by receiving the user command from a user. To be more specific, the key input unit 110 transmits a read command signal or a write command signal to the controller 120, in a case the key input unit 110 receives the read command signal or the write command signal from the user, and causes the controller 120 to perform the read or write operation.

The controller 120 controls an entire operation for parameter copy function of inverter for keypad 100. To be more specific, the controller 120 determines inverter types of a plurality of inverters 200-1, 200-2 connected to the communication unit 130, described later, and compares the types.

As a result of comparison, if each type of the inverters 200-1, 200-2 is same, the controller 120 reads out a parameter of the first inverter 200-1 to set the parameter of the first inverter to a parameter corresponding to the type of the second inverter 200-2. At this time, the read-out of the parameter of first inverter 200-1 may be performed, in a case a read command is inputted from the key input unit 110, and setting of the parameter of the first inverter 200-1 to a parameter corresponding to the type of the second inverter 200-2 may be performed, in a case a write command is inputted from the key input unit 110.

Furthermore, as a result of comparison, if each type of the inverters 200-1, 200-2 is not same as the inverter type stored in the storage 140, the controller 120 reads out the parameter of the first inverter to convert the parameter of the first inverter 200-1 to a parameter corresponding to the type of the second inverter 200-2 and to perform a parameter copy relative to the second inverter 200-2.

That is, the parameter read out from the first inverter 200-1 may be converted to a parameter suitable to the second inverter type 200-2, and the converted parameter may be set relative to the second inverter 200-2.

Meanwhile, the controller 120 may compare program versions of the plurality of inverters 200-1, 200-2 received through the communication unit 130, described later. The controller 120 may perform a parameter copy function, only if it is determined that the program version of the first inverter 200-1 received from the communication unit 130 are same as the program version of the second inverter 200-2.

As a result of comparison, if each type of the inverters 200-1, 200-2 is not same, the controller 120 reads out the parameter of the first inverter 200-1 to convert the parameter of the first inverter 200-1 to a parameter corresponding to the type of the second inverter 200-2 and to perform a parameter copy relative to the second inverter 200-2.

The communication unit 130 is connected to the first and second inverters 200-1, 200-2, and performs transmission/reception of data with the first and second inverters 200-1, 200-2. Particularly, the communication unit 130 further performs transmission/ reception of inverter type and program version information, and even the already-set parameter information the first and second inverters 200-1, 200-2.

The communication unit 130 also may read out or set parameters included in the first and second inverters 200-1, 200-2 under the control of the controller 120, in a case a read command or a write command is transmitted from the key input unit 110 to the controller 120.

The storage 140 functions to store information of the first and second inverters 200-1, 200-2 received from the communication unit 130. The storage 140 also functions to read out a parameter from the first inverter 200-1 having a parameter to be copied and temporarily store the parameter. Thereafter, the temporarily stored parameter may be set relative to the second inverter 200-2 or may be converted and set relative to the second inverter 200-2 in response to the control of the controller 120.

Although FIG. 4 explained a case where the parameter of the first inverter 200-1 is copied relative to the second inverter 200-2, alternatively, a plurality of inverter parameters may be copied by a plurality of inverters and it should be apparent that the keypad according to the exemplary embodiment of the present disclosure is applicable.

Furthermore, although the process of the parameter of the first inverter 200-1 being copied relative to the second inverter 200-2 has been explained, alternatively, it should be apparent that the process of the parameter of the second inverter 200-2 being copied relative to the first inverter 200-1 can be also realized in the same manner.

Hereinafter, operation of keypad 100 will be described with reference to FIGS. 5 and 6, in a case read and write commands are transmitted.

Figure 5:
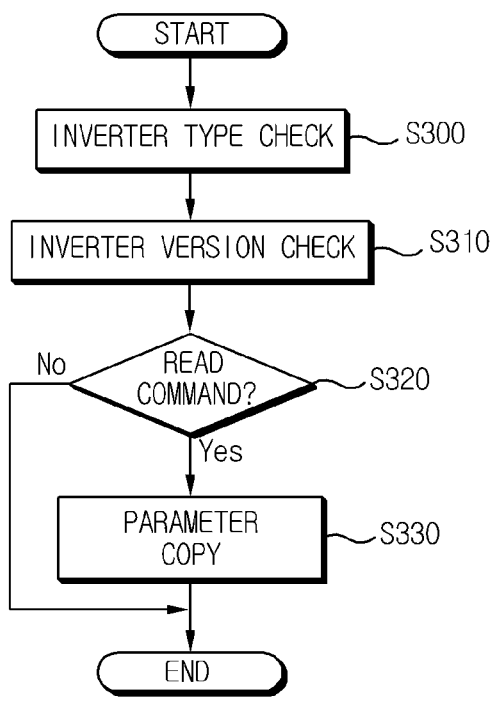
FIG. 5 is a flowchart illustrating a process in which a read-out command is performed in a keypad according to an exemplary embodiment of the present disclosure.

FIG. 5 is a flowchart illustrating a read-in process of parameter of the first inverter 200-1 illustrated in FIG. 4.

Referring to FIG. 5, the keypad 100 checks the type of the first inverter 200-1 connected to the communication unit 130 S300. Furthermore, the keypad 100 checks a program version of the first inverter 200-1 (S310).

To be more specific, the keypad 100 may receive information including the type and program version of the first inverter 200-1 through the communication unit 130. Thereafter, in a case a read command of a user is received through the keypad 100 (S320-Yes), the keypad 100 copies the parameter of the first inverter 200-1 through the communication unit 130. That is, the keypad 100 reads in the parameter of the first inverter 200-1 through the communication unit 130 and stores the parameter in the storage 140. However, in a case a read command of a user is not received from the key input unit 110 (S320-No), the keypad 100 may not perform any operation.

Figure 6:
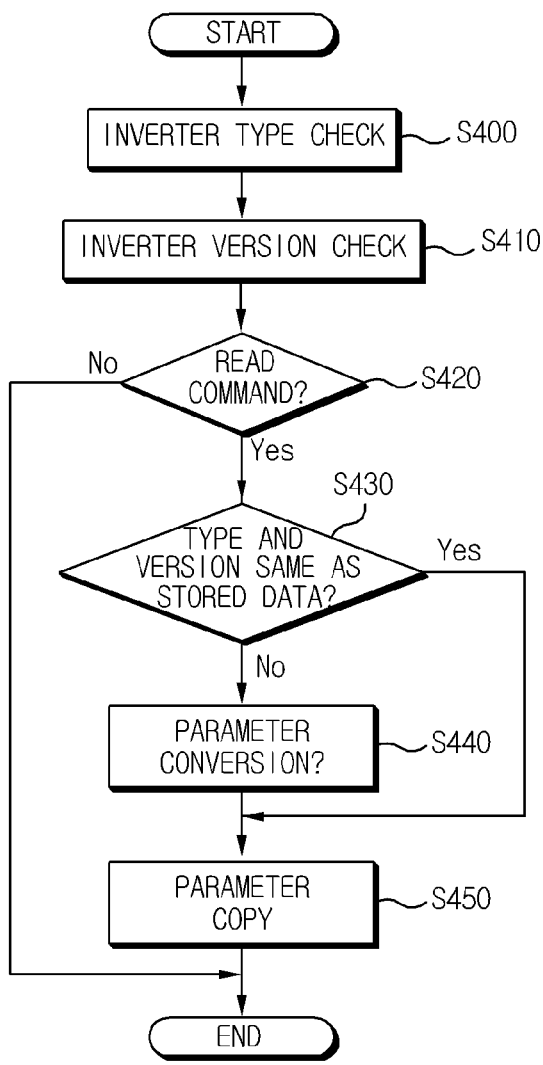
FIG. 6 is a flowchart illustrating a process in which a write command is performed in a keypad according to an exemplary embodiment of the present disclosure.

FIG. 6 is a flowchart illustrating a set-up process of parameter read in from the first inverter 200-1 to the second inverter 200-2 of FIG. 4.

As in FIG. 5, the keypad 100 checks the type or program version of the second inverter 200-2 (S400, S410).

Thereafter, determination is made as to whether the type of the first inverter 200-1 and the type of the second inverter 200-2 are same (S430) in a case a write command is received from the key input unit 110 (S420-Yes).

The parameter copy of the first inverter 200-1 relative to the second inverter 200-2 is performed, only if it is determined that the types of the first inverter 200-1 and the type of the second inverter 200-2, and program versions of the first inverter 200-1 and the type of the second inverter 200-2 are same.

However, if it is determined that the types of the first inverter 200-1 and the second inverter 200-2, and program versions of the first inverter 200-1 and the second inverter 200-2 are not same (S430-No), the parameter read from the first inverter 200-1 is converted to a parameter suitable to the type or program version of the second inverter 200-2 (S440), and a parameter copy relative to the second inverter 200-2 is performed (S450).

At this time, the parameter type suitable to the second inverter 200-2 may be pre-stored in the storage 140. That is, the inverter type and the parameter version corresponding to those of the second inverter 200-2 may be stored in a form of a table. Meanwhile, in a case no write command is received from the key input unit 110 (S420-No), no operation may be performed.

Figure 7:
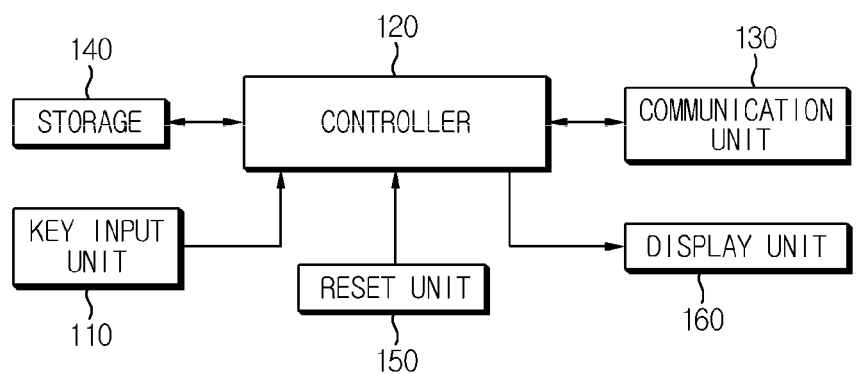
FIG. 7 is a block diagram illustrating a configuration of a keypad according to another exemplary embodiment of the present disclosure.

FIG. 7 is a block diagram illustrating a configuration of a keypad according to another exemplary embodiment of the present disclosure.

Although configuration of keypad in FIG. 7 is same as that of FIG. 4 for the most part, the configuration of keypad in FIG. 7 further includes a reset unit 150 and a display unit 160 in addition to that of FIG. 4. That is, the keypad according to another exemplary embodiment of the present disclosure includes a key input unit 110, a controller 120, a communication unit 130, storage 140, a reset unit 150 and a display unit 160.

Functions of the key input unit 110, the controller 120, the communication unit 130 and the storage 140 are same as those of FIG. 4, such that no redundant explanation thereto will be provided hereafter.

The reset unit 150 functions to assist a stable operation of the controller 120. To be more specific, the reset unit 150 checks an operation voltage to allow the controller 120 to perform at a stable operational voltage lest the controller 120 operate in an erroneous manner. The controller 120 may receive a reset signal from the reset unit 150 to start the operation.

The display unit 160 displays data stored in the storage 140 and operation states of the first and second inverters 200-1, 200-2. To be more specific, the display unit 160 may display whether the first and second inverters 200-1, 200-2 are operating, display the inverter types and program version information of the first and second inverters 200-1, 200-2 stored in the storage 140 and display a parameter of the first inverter 200-1 to be copied relative to the second inverter 200-2, allowing the user to instinctively recognize the program version and inverter type.

Furthermore, the display unit 160 functions to display the performances of read and write commands, parameter conversion in case of different inverter types so that the user can recognize thereof.

Figure 8:
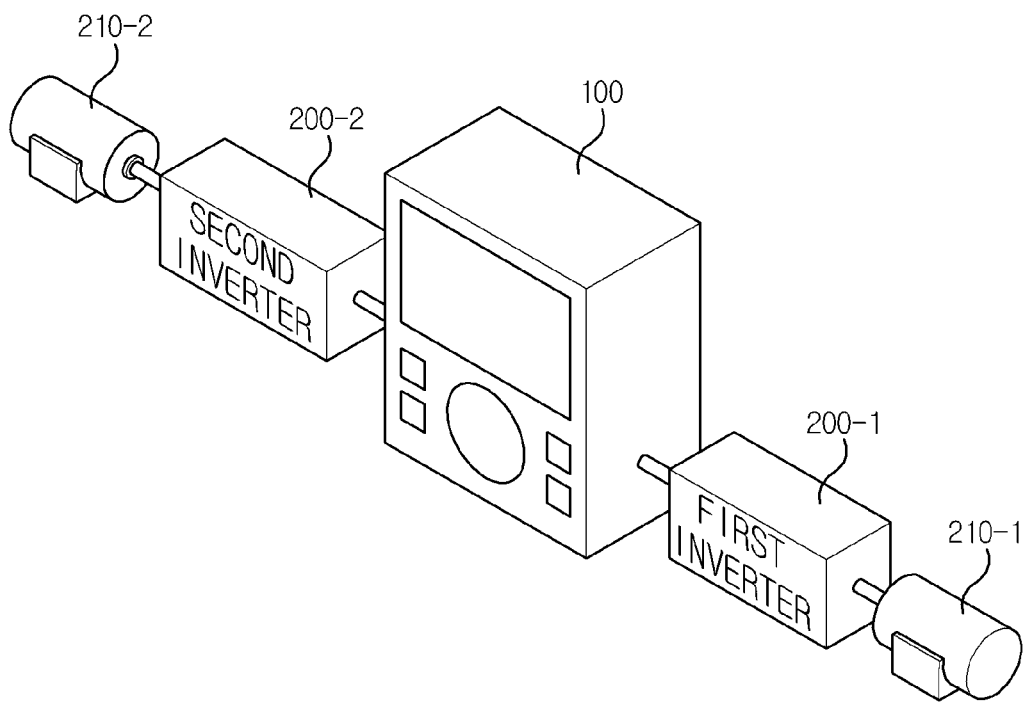
FIG. 8 is a schematic view illustrating in detail an operation method of a keypad according to an exemplary embodiment of the present disclosure.

FIG. 8 is a schematic view illustrating in detail an operation method of a keypad, i.e., an environment the keypad is used, according to an exemplary embodiment of the present disclosure.

At this time, the first inverter 200-1 controls the operation of a first motor 210-1, and the second inverter 200-2 controls the operation of a second motor 210-2. Meantime, the keypad 100 functions to copy the parameter of the first inverter 200-1 relative to the second inverter 200-2.

Now, to sum the foregoing, the keypad 100 checks the types and program versions of first and second inverters 200-1, 200-2, reads out the parameter of the first inverter 200-1 as it is and set same in the second inverter 200-2, in a case each inverter type and program version is same, but converts the parameter of the first inverter 200-1 relative to the type and program version of the second inverter 200-2, in a case each inverter type and program version is not same and sets the converted parameter suitable to and relative to the second inverter 200-2.

The configuration of keypad according to exemplary embodiments of the present disclosure has an industrial applicability in that parameters can be easily copied regardless of types and program versions of inverter, and parameter copy in a plurality of inverters each having a different type can be easily performed.

Although the present disclosure has been described with reference to a number of illustrative embodiments thereof, it should be understood that numerous other modifications and embodiments can be devised by those skilled in the art that will fall within the spirit and scope of the principles of this disclosure.

More particularly, various variations and modifications are possible in the component parts and/or arrangements of subject combination arrangement within the scope of the disclosure, the drawings and the appended claims. In addition to variations and modifications in the component parts and/or arrangements, alternative uses will also be apparent to those skilled in the art.

What is claimed is:

1. A keypad, the keypad comprising:
   a communication unit transmitting data to a plurality of inverters and receiving data from the plurality of inverters; and
   a controller determining whether type of a first inverter received from the communication unit is same as that of a second inverter, and performing a parameter copy if the type of the first inverter received from the communication unit is same as that of the second inverter,
   wherein the controller reads out a parameter of the first inverter to convert the parameter of the first inverter to a parameter corresponding to the type of the second inverter and to perform a parameter copy relative to the second inverter, if it is determined that the type of the first inverter received from the communication unit is not the same as that of the second inverter.

2. The keypad of claim 1, wherein the controller determines whether the type of the first inverter received from the communication unit is same as that of the second inverter, and reads out the parameter of the first inverter to perform a parameter copy function relative to the second inverter if the type of the first inverter received from the communication unit is same as that of the second inverter.

3. The keypad of claim 1, wherein the controller reads out a program version of the first inverter received from the communication unit and a program version of the second inverter, and performs a parameter copy function only if it is determined that the program version of the first inverter received from the communication unit and the program version of the second inverter are same.

4. The keypad of claim 3, wherein the controller reads out the parameter of the first inverter to convert the parameter of the first inverter to a parameter corresponding to the program version of the second inverter and to perform a parameter copy relative to the second inverter, if it is determined that the program version of the first inverter received from the communication unit is not the same as that of the second inverter.

5. The keypad of claim 1, further comprising a key input unit receiving a parameter copy command from a user.

6. The keypad of claim 5, wherein the parameter copy command is a command for reading out the parameter of the first inverter or a command for setting the read-out parameter to the second inverter.

7. The keypad of claim 1, further comprising storage for temporarily storing the types or program versions of inverter received through the communication unit, and parameters of inverter read out through the communication unit.

8. The keypad of claim 1, further comprising a display unit for displaying an operation state of at least one inverter connected through the communication unit.

9. The keypad of claim 1, further comprising a reset unit for preventing an erroneous operation of the controller by checking an operation voltage for operating the controller.

10. A parameter copy method of a keypad having parameter copy function by recognizing software versions and inverter types, the method comprising:
  determining, by a controller in the keypad, a type of a first inverter and a type of a second inverter;
  determining, by the controller, whether the type of the first inverter and the type of the second inverter are same;
  performing, by the controller, a parameter copy function if it is determined that the type of the first inverter and the type of the second inverter are same; and
  reading out, by the controller, a parameter of the first inverter to convert the parameter of the first inverter to a parameter corresponding to the type of the second inverter and performing a parameter copy relative to the second inverter, if it is determined that the type of the first inverter is not the same as the type of the second inverter.

11. The parameter copy method of claim 10, wherein performing the parameter copy function includes: reading out a parameter of the first inverter to perform a parameter copy function relative to the second inverter, if the type of the first inverter is same as that of the second inverter by determining the type of the first inverter and the type of the second inverter.

12. The parameter copy method of claim 10, further comprising:
  reading out a program version of the first inverter and a program version of the second inverter, wherein the parameter copy function performs a parameter copy function only if it is determined that the program version of the first and the program version of the second inverter are same.

13. The parameter copy method of claim 12, further comprising reading out the parameter of the first inverter to convert the parameter of the first inverter to a parameter corresponding to the program version of the second inverter and performing a parameter copy relative to the second inverter, if it is determined that the program version of the first inverter is not the same as that of the second inverter.

14. The parameter copy method of claim 10, further comprising receiving a parameter copy command from a user.

15. The parameter copy method of claim 14, wherein the parameter copy command is a command for reading out the parameter of the first inverter or a command for setting the read-out parameter to the second inverter.

\* \* \* \* \*